3,436,424
PROCESS FOR PREPARING BIS(TRIFLUOROMETHYL)TRIOXIDE

Lowell Ray Anderson, Parsippany, and William B. Fox, Morristown, N.J., assignors to Allied Chemical Corporation, New York, N.Y., a corporation of New York
No Drawing. Filed Sept. 20, 1966, Ser. No. 580,621
Int. Cl. C07c 73/04
U.S. Cl. 260—610      4 Claims

ABSTRACT OF THE DISCLOSURE

Bis(trifluoromethyl)trioxide is prepared by reacting carbonyl fluoride with oxygen difluoride in the presence of a catalyst selected from the group consisting of CsF, RbF, KF and NaF.

---

This invention relates to an improved method for preparing bis(trifluoromethyl)trioxide, ($CF_3OOOCF_3$).

$CF_3OOOCF_3$ is a known compound and under standard conditions is a colorless gas having a freezing point of about $-138°$ C. and a boiling point of about $-16°$ C. $CF_3OOOCF_3$ has been prepared by the photolysis of equimolar amounts of hexafluoroazomethane ($CF_3N=NCF_3$) and oxygen. (See V. A. Ginsburg, et al., Photoreactions of Hexafluoroazomethane with Unsaturated Compounds, Doklady Akademii Nauk SSSR, vol. 149, No. 1, pages 97–99, March–April 1963).

$CF_3OOOCF_3$ is a useful intermediate, particularly for the preparation of bis(trifluoromethyl)peroxide, $$CF_3OOCF_3,$$

which in turn is known to be useful as an initiator for the polymerization of ethylenically unsaturated compounds (cf. U.S. Patents 3,069,404 and 3,202,718).

Unfortunately, $CF_3N=NCF_3$, previously known starting material for the synthesis of $CF_3OOOCF_3$, is an exotic compound which is not commercially available and is difficult and costly to prepare.

It is the principal object of this invention to provide an improved process for the preparation of $CF_3OOOCF_3$.

A more particular object of the invention is to provide a method for preparing $CF_3OOOCF_3$ from simple, inexpensive and commercially available raw materials.

Other objects and advantages of the invention will become apparent from the forthcoming description.

It has been found that the objects of the invention may be accomplished by reacting carbonyl fluoride with oxygen difluoride in the presence of a catalyst in accordance with the equation:

$$2COF_2 + OF_2 \xrightarrow{\text{catalyst}} CF_3OOOCF_3$$

A class of catalysts which have been found to be suitable are the alkali metal fluorides, e.g., CsF, RbF, KF and NaF. Of this class, CsF and RbF are preferred. Other suitable catalysts may be found by those skilled in the art. Preferably, the catalyst is activated prior to use by grinding or by other treatment designed to increase surface area.

Reaction temperatures are not absolutely critical. Unduly low temperatures, however, result in non-feasible reaction rates, and temperatures above about $70°$ C. should be avoided since $CF_3OOOCF_3$ decomposes above about $70°$ C. to produce $CF_3OOCF_3$, $O_2$ and $F_2CO$. The decomposition of $CF_3OOOCF_3$ is the method employed to produce the useful $CF_3OOCF_3$. Generally, then, temperatures should be maintained between about $0-70°$ C. The reaction proceeds readily at room temperature. i.e., about $25°$ C. and room temperature is accordingly preferred for reasons of convenience.

The molar proportions of the $COF_2$ and $OF_2$ reactants are not critical and may be varied over a wide range. For reasons of economy and convenience, it is preferable to use stoichiometric amounts of the reactants, i.e., two moles of $COF_2$ to one mole of $OF_2$. Large excesses of one or the other reactants will not deleteriously affect the reaction and it has been found, as illustrated in the appended examples, that good yields of product are obtained when approximately equimolar proportions of the reactants are employed.

The reaction will proceed under atmospheric, superatmospheric or subatmoshperic pressures. Due to the fact that the reactants and product are all gases, it is advantageous to employ standard vacuum techniques in order to facilitate handling and measurement of the gaseous material.

When vacuum equipment is employed, for example, the reactor may be provided with reactor charging equipment which may include a valved outlet which facilitates sealing off the reactor and alternative opening of the same to afford connection of the reaction zone with a high vacuum suction conduit, which in turn may have associated therewith various cold traps.

Residence times of $COF_2$ and $OF_2$ in the reactor will vary depending upon such variables as reaction temperature, yield desired, catalyst, state of activation of the catalyst and size of the operation.

A feature of the novel process is that high yields of the sought-for $CF_3OOOCF_3$ product are obtainable with a minimum of undesirable side products. Side products and impurities which will occur in the reaction product include $CF_4$, $SiF_4$, $CO_2$ and $CF_3OOCF_3$. The crude $CF_3OOOCF_3$ product may be employed for preparing $CF_3OOCF_3$ as such, or if desired, it may first be purified by vacuum pumping, to remove excess $OF_2$, if any, followed by vacuum line fractionation of the product through a cold trap maintained at about $-145°$ C. The remaining impurities and byproducts will pass through the $-145°$ C. trap leaving purified $CF_3OOOCF_3$ behind.

The yield of the $CF_3OOOCF_3$ product will vary with the reaction time and the nature and history of the catalyst employed. Maximum yields have been obtained with CsF and BbF catalysts which have been activated as described above. Yield generally increases with the reaction time.

The following illustrate practice of the invention.

Details given are illustrative only and are not intended to constitute limitations upon the invention.

Example 1

A quantity of CsF was dried, in vacuo, at $160°$ C. and then activated by grinding for five (5) hours in a Spex Mixer/Mill Model 8000 using a tungsten carbide capsule and ball. Approximately two (2) g. of the activated CsF was introduced into a small glass reaction tube of about 30 ml. capacity. The reaction tube was then capped and equipped with a valve. Standard vacuum techniques were used to measure and condense equimolar amounts (3.26 mmoles) or purified $COF_2$ and $OF_2$ through the valve into the reaction tube. The reaction tube valve was then closed, and the contents allowed to react overnight at room temperature. At the end of this period, the gases above the CsF catalyst were pumped at $-196°$ C. to remove excess $OF_2$. The product was then vacuum line fractionated through a trap maintained at about $-145°$ C. The impurities, which were present in relatively small amounts, consisted of $CF_4$, $SiF_4$, $CO_2$ and $CF_3OOCF_3$. These passed slowly through the $-145°$ C. trap leaving the purified product behind. The product was a colorless gas with a freezing point of $-138°$ C. and a boiling point of −16° C. Elemental analysis of the product gave the following:

*Analysis.*—Calculated for $C_2F_6O_3$: C, 12.9%; F, 61.3%. Found: C, 13.2%; F, 59.4%.

Upon heating to above 70° C, the product decomposed to produce $CF_3OOCF_3$, $O_2$ and $F_2CO$. Identity of the product was confirmed by the above data and was verified by infrared and NMR analysis.

The yield of $CF_3OOOCF_3$, based upon the amount of $COF_2$ introduced, was about 10%. The yield was estimated by comparing the 900 cm.$^{-1}$ absorption of the crude $CF_3OOOCF_3$ material with that of the known pressure of the pure material.

Example 2

The procedure of Example 1 was repeated excepting that 3.28 mmoles each of the reactants were condensed onto activated CsF catalyst which had been used in two previous runs, and the reaction was allowed to proceed for approximately four (4) days. At the end of this period, the yield of $CF_3OOOCF_3$ obtained, based upon the amount of $COF_2$ introduced, was 88.5%.

Example 3

The procedure of Example 1 was repeated with 3.28 mmoles each of the reactants, excepting that RbF was employed as the catalyst. The yield of $CF_3OOOCF_3$ obtained was of the order reported in Example 1 for a corresponding reaction period.

Example 4

The procedure of Example 1 was repeated using 3.28 mmoles of $COF_2$ and 3.22 mmoles of $OF_2$ over a KF catalyst. It was found that $CF_3OOOCF_3$ was produced although in lower yields and only after longer reaction periods than occurred with the CsF and RbF catalysts.

We claim:
1. The process which comprises reacting carbonyl fluoride with oxygen difluoride in the presence of a catalyst selected from the group consisting of CsF, RbF, KF and NaF, at temperatures not exceeding about 70° C. to form bis(trifluoromethyl)trioxide.
2. The process of claim 1 which is carried out at temperatures between about 0–70° C.
3. The process of claim 2 in which the catalyst is CsF.
4. The process of claim 2 in which the catalyst is RbF.

References Cited

UNITED STATES PATENTS 3,202,718   9/1965   Ellingboe et al. _____ 260—610

OTHER REFERENCES

Ginsburg et al.: Doklady Akad. Nauk. SSR., Vol. 149, No. 1, pp. 97–99 (1963).

LEON LITVER, *Primary Examiner.*

W. B. LONE, *Assistant Examiner.*